United States Patent [19]
Hasegawa et al.

[11] Patent Number: 5,239,424
[45] Date of Patent: Aug. 24, 1993

[54] INFORMATION RECORDING/REPRODUCING APPARATUS FOR RECORDING INFORMATION AND VERIFYING RECORDED INFORMATION

[75] Inventors: Shoji Hasegawa; Shunji Kagamibashi, both of Osaka, Japan

[73] Assignee: Matsushita Electric Industrial Co., Ltd., Osaka, Japan

[21] Appl. No.: 636,452

[22] Filed: Dec. 31, 1990

[30] Foreign Application Priority Data

Jan. 8, 1990 [JP] Japan .................................. 2-1221

[51] Int. Cl.[5] .......................... G11B 5/09; G11B 27/36
[52] U.S. Cl. ........................................ 360/53; 360/48; 369/53
[58] Field of Search ............... 360/53, 31, 48, 49; 369/53, 54, 60

[56] References Cited

U.S. PATENT DOCUMENTS 4,791,622 12/1988 Clay et al. .............................. 369/59
4,920,528 8/1990 Sakamoto et al. ...................... 369/54

FOREIGN PATENT DOCUMENTS 0383298 8/1990 European Pat. Off. .
0364229 4/1991 European Pat. Off. .
3612815 10/1986 Fed. Rep. of Germany .
3704213 8/1987 Fed. Rep. of Germany .
2175123 11/1986 United Kingdom .

Primary Examiner—Aristotelis Psitos
Assistant Examiner—Won Tae C. Kim
Attorney, Agent, or Firm—Lowe, Price, LeBlanc & Becker .

[57] ABSTRACT

An information recording/reproducing apparatus for recording and reproducing information on and from a recording medium having thereon spiral or coaxial tracks and rotatable by a rotating device. The information recording/reproducing apparatus comprises a memory for temporarily storing the information, and a recording/reproducing drive unit coupled to the memory for recording and reproducing the information stored in the memory means on the recording medium. Also included in the apparatus is a control unit coupled to the memory and further the recording/reproducing drive unit for controlling the recording of the information on the recording medium on the basis of the data stored in the memory and the reproduction of the information therefrom to verify the recorded information. The control unit divides data, which is the information to be recorded, into two or more blocks and varies the length of the data to divided in accordance with the number of sectors in each of the tracks formed on the said recording medium.

7 Claims, 4 Drawing Sheets

INFORMATION RECORDING/REPRODUCING APPARATUS FOR RECORDING INFORMATION AND VERIFYING RECORDED INFORMATION

BACKGROUND OF THE INVENTION

The present invention relates generally to an information recording/reproducing apparatus for recording and reproducing information on and from a disc-like recording medium such as a magnetic disc and an optical disc, and more particularly to such an information recording/reproducing apparatus for verifying or confirming the quality of the information recorded on the disc-like recording medium.

Recently, in accordance with high-speed operation and high performance of computers there is also required high-speed operation and high performance of peripheral equipment. Particularly, it is strongly required for secondary storages such as a magnetic disc drive and an optical disc drive to reduce the access time concurrently with ensuring high reliability so as to increase the data transfer speed and the capacity. Thus, in practical use, in order to reduce the weight of the recording/reproducing head, to increase the rotational speed of the recording medium, to increase the recording density and to reduce the access time, the MCAV system (Modified Constant Angular Velocity system) for recording and reproducing is known where the rotational speed of the recording medium is made constant so as to change the frequency of the demodulation and modulation in accordance with the access position. This MCAV system is arranged such that the recording medium is radially divided from the inner circumference to the outer circumference into a plurality of groups each of which has a constant number of sectors, and in each of the groups one or more sectors are increased or decreased to perform the division into the groups so that the recording pits are formed constantly at the inner and outer circumferences thereof.

For writing data on the recording medium, in view of reliability, after completion of operation of the recording of data (which will be referred hereinafter to as writing), the data is read out so as to check the quality of the written data (which will be referred hereinafter to as verification), that is, a write-and-verify operation is performed after recording. This operation will be described hereinbelow with reference to FIG. 1 showing a general arrangement of an optical disc system. In FIG. 1, data outputted from a host computer 1 to be written- are inputted through a host interface 2 to a buffer memory 4 of a controller 3. In response to start of storing the data to the buffer memory 4, the data are supplied to an EDAC 5 in units of an amount corresponding to one sector of the recording medium where an error-correction code is added. The EDAC 5 acts as a bit error detection and correction circuit in which a predetermined bit is inserted into the data in accordance with an adequate calculation equation so as to find the error bit position when an error such as bit inversion occurs on reproduction. Thereafter, the data are supplied to a MODEM 6 for modulation to a code suitable for the recording on the optical disc and demodulation of the reproduced signal, and then supplied to a drive unit 7 to be written through a recording/reproducing head 8 on a recording medium 9. The MODEM 6 functions as a modulation and demoduation circuit to perform the modulation for recording to the recording medium 9 and perform the demodulation of the signal read out from the recording medium 9 to the original data before the recording.

Further, in the case of performing the write-and-verify operation, the data stored in the buffer memory 4 is kept as it is until the sector in which the data are recorded is completely verified, and when a problem is found by the verification, the data kept in the buffer memory 4 are transferred to the drive unit 7 for a changing process to other sectors.

FIG. 2 is an illustration of a process of a write-and-verify command corresponding to the number of the recording sectors where the vertical axis represents the time (rotational speed) and horizontal axis represents the number of the recording sectors. For example, in cases where the buffer memory 4 has a capacity corresponding to 48 sectors, the data to be stored in the recording medium 9 correspond to 56 sectors, and the overall 48 sector capacity is used for the write-and-verify operation, when the data corresponding to 48 sectors are transferred from the host computer 1, the data transfer is once interrupted and the data corresponding to 48 sectors stored in the buffer memory 4 are recorded on the recording medium 9 from a sector m (logic block address) up to a sector m+47. This procedure is indicated by a character A in FIG. 2.

Secondly, with the recording/reproducing head 8 seeking (moving the head) for the track of a sector m, preparation is made for the verification as indicated by B in FIG. 2. After a predetermined sector-waiting time as indicated by C in FIG. 2, that is, while the target sector m arrives, the data from the target sector m up to the sector m+47 are read out and transferred to the controller 3. This transferred data are verified in quality (bit error, read level and others) in units of one sector as indicated by D in FIG. 2. If there is no problem, the buffer memory 4 is released. On the other hand, if there is a problem, the data of the buffer memory 4 corresponding to the sector are supplied to the drive unit 7 so as to be recorded in a sector-changing area on the recording medium 9. Thereafter, the portion of the buffer memory 4 corresponding to the changed sector is released and the next data are transferred from the host computer 1 to this released portion.

When the verification is completed up to the sector m+47, under control of the controller 3, the recording/reproducing head 8 of the drive unit 7 seeks the next sector m+48, and the remaining data corresponding to 8 sectors are transferred through the EDAC 5 and the MODEM 6 to the drive unit 7. After waiting for a given write-sector as indicated by E, as well as described above, the writing operation F, seeking operation G, verify-sector waiting operation H and verification J are successively effected as illustrated in FIG. 2.

In such an information recording/reproducing apparatus, in the case that the write-and-verify operation is performed under the condition of division into a plurality of blocks, when the number of the sectors to be written and verified at a time in the blocks other than the final block is made constant, particularly in the MCAV system, the number of the sectors in one track is increased or decreased in each of the respective groups whereby the seeking operation B is effected between the writing operation A and the verification D, and the verify-sector waiting time C varies in each of the respective groups.

Accordingly, in accordance with variation of the executing speed in each of the groups, the operation becomes unstable when viewed from the host computer 1, and a problem arises in that the entire processing is delayed when the sector-waiting time becomes long. FIG. 3 shows a state wherein the data to be recorded are divided into a plurality of blocks and the number of the sectors in one track is 28 under the condition that the capacity of the buffer memory for the writing operation A and the verification is fixed to 48 sectors. Further, in FIG. 3, for writing data by 48 sectors from the sector m, the seeking operation is performed from the sector (m+47), taken after writing the data corresponding to one revolution (28 sectors) plus 20 sectors, to the sector m for the verification. During the seeking operation, a preparation for the verification is made. The time period for the seeking operation and the verification preparation is indicated by T in FIG. 3. Here, for example, in cases where about 8/28 of the time required for one revolution of the recording medium 9 is required as the time for the seeking operation and verification preparation, the first verified sector m is immediately detectable after the completion of the verification preparation and hence the sector-waiting time becomes at a minimum.

Further, FIG. 4 shows the case that the number of the sectors in one track is 26 under the condition that the buffer memory capacity for the writing operation A and the verification D is fixed to 48, and further shows a state that the first sector m for the verification is passed when the verification preparation (seeking operation) is effected after 48 sectors are written.

In comparison with the state illustrated in FIG. 3, in the case of the FIG. 4 state that the sector m is passed, the verification is performed after elapse of the time period corresponding to one revolution and hence the verification waiting time is lengthened by the time approximately corresponding to one revolution to cause the execution time to be delayed. The verification waiting time is always constant in the same group but the execution time is rapidly shortened or lengthened when the verification is effected over different groups, and hence the operation viewed from the host computer 1 becomes unstable and further the write-and-verify execution time becomes long because the sector-waiting time becomes long. Generally, the sector-waiting time is lengthened to decrease the execution speed in accordance with increase in the amount of the procedure (erase, recording, confirmation and others) in the write-and-verify operation and the amount of information to be recorded and further in accordance with decrease in the capacity of the buffer memory in the controller 3.

SUMMARY OF THE INVENTION

It is therefore an object of the present invention to provide an information recording/reproducing apparatus which is capable of making stable and increasing the execution speed of the write-and-verify operation.

In accordance with the present invention, there is provided an information recording/reproducing apparatus for recording and reproducing information on and from a recording medium having thereon spiral or coaxial tracks and rotatable by rotating means, the information recording/reproducing apparatus comprising: memory means for temporarily storing the information; recording/reproducing means coupled to the memory means for recording and reproducing the information stored in the memory means on said recording medium; and control means coupled to the recording/reproducing means for controlling the recording/reproducing means to record the information on the recording medium and to reproduce the information from the recording medium so as to verify the recorded information, said control means dividing data, which -is the information to be recorded, into two or more blocks and varying the length of the data to divided in accordance with the number of sectors in each of the tracks formed on the recording medium.

Preferably, the length of the data to be divided is determined so that a sector-waiting time taken while the recorded data are reproduced for the verification becomes at a minimum, and the coaxial or spiral tracks of the recording medium are divided radially into a plurality of groups, and the number of the sectors per track in each of the divided groups is successively increased and decreased in proportion to a position of the recording medium in the radial directions.

That is, an information recording/reproducing apparatus according to the present invention is arranged to record and reproduce information on a disc-like recording medium having spiral or coaxial tracks, these tracks being radially divided into a plurality of groups and the number of sectors in the group being increased and decreased in the radial directions. The disc-like recording medium is rotatable by a rotating means and the information is recorded and reproduced through a head means. The information recording/reproducing apparatus has a function to verify the recorded in formation on the recording medium. When dividing a series of information into- two or more blocks for the recording, the length of the data to be divided is arranged to be varied in accordance with the number of the sectors in one track. This arrangement allows the verification-waiting time to become at a minimum and permits the execution speed viewed from the host computer to become stable and further allows the execution speed to be increased. Further, in the case of using different kinds of recording medium, when dividing a series of information to be recorded and recording then, the length of the data to be divided is arranged to vary in accordance with the number of the sectors in one track. Thus, the verification-waiting time can be set to a minimum in the respective kinds of recording medium and the execution speed can be increased. Further, the length of the data to be divided is set, so that while the recording data are reproduced by the verifying means the sector-waiting time becomes a minimum, whereby the verification-waiting time can further be decreased so as to increase the execution speed.

BRIEF DESCRIPTION OF THE DRAWINGS

The present invention will be described in further detail with reference to the accompanying drawings, in which.

DETAILED DESCRIPTION OF THE INVENTION

Figure 1:
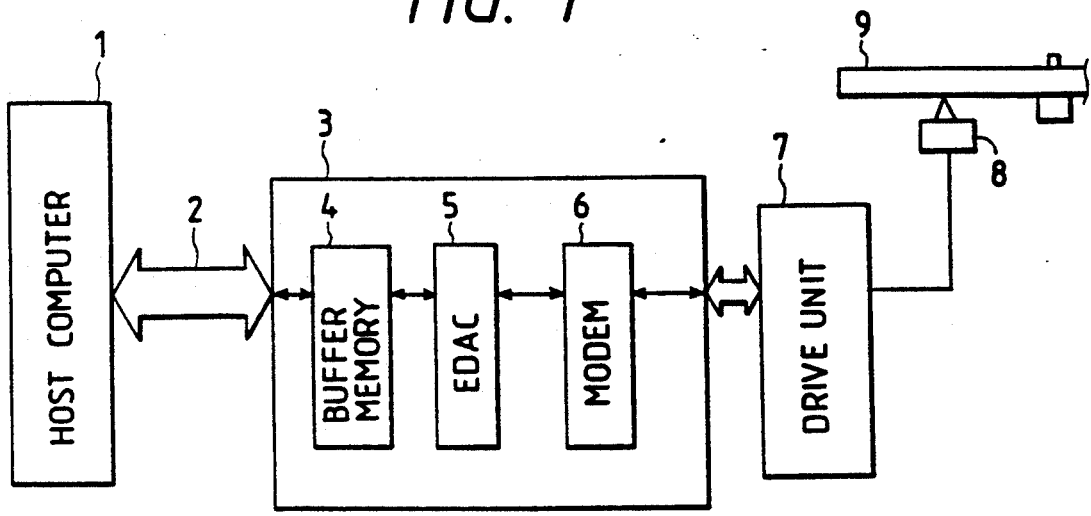
FIG. 1 is a block diagram showing a general arrangement of an optical disc system.
Figure 2:
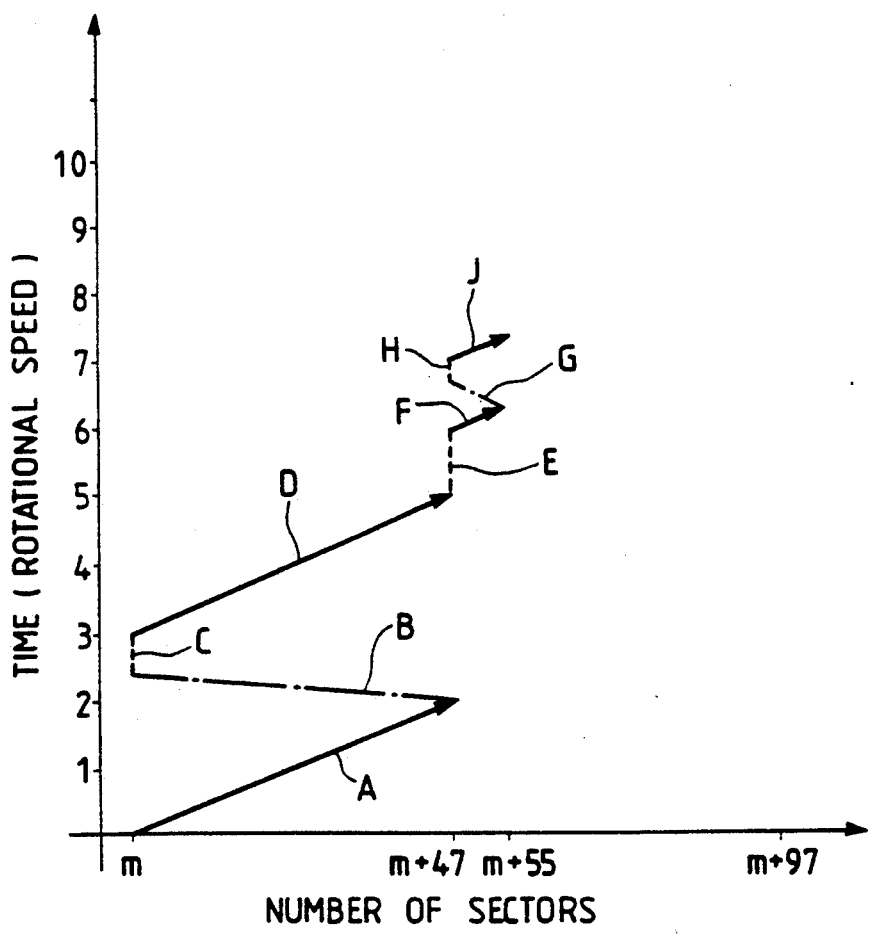
FIG. 2 is a graphic diagram showing the procedure of a conventional write-and-verify operation.
Figure 3:
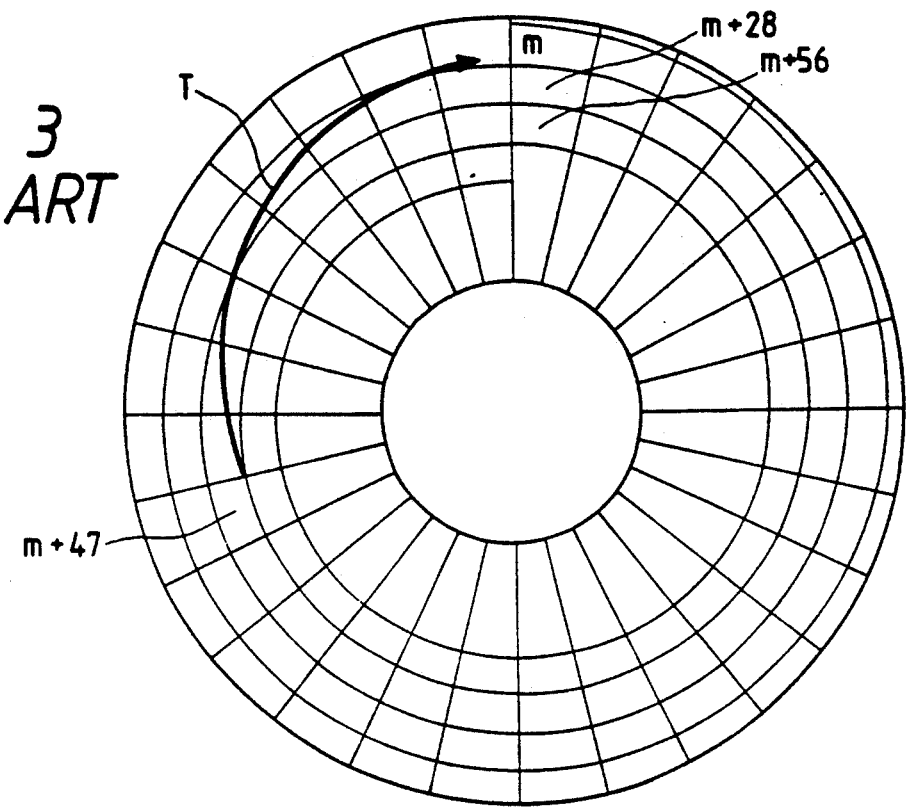
FIGS. 3 and 4 are illustrations of conventional states for a seeking operation and a verification-preparation.
Figure 4:
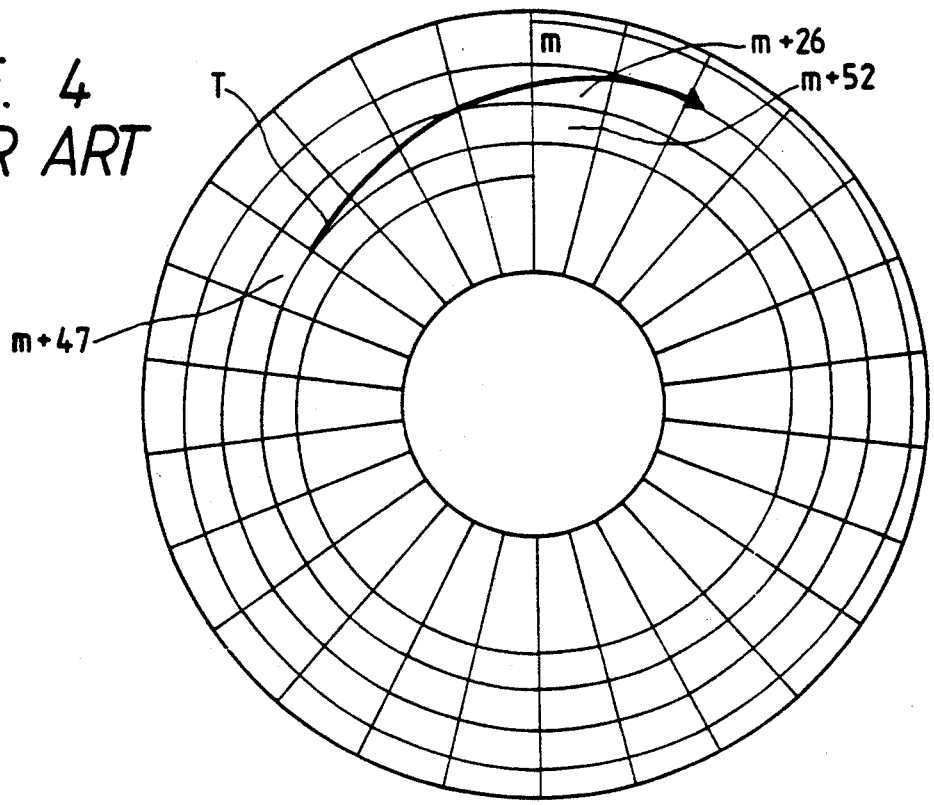
Figure 5:
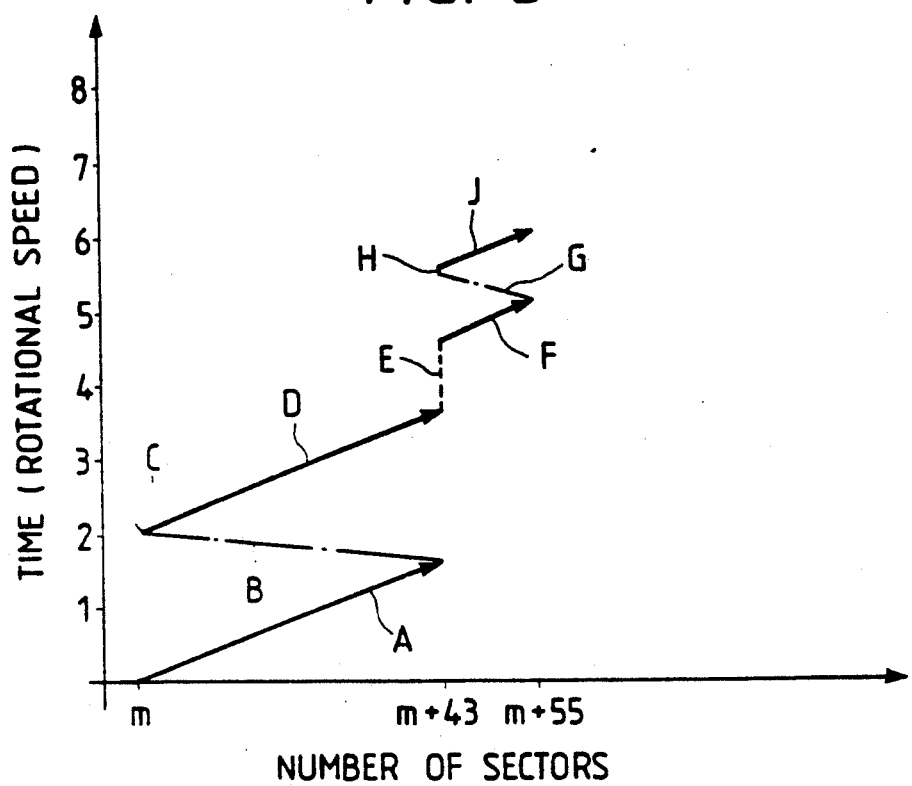
FIG. 5 is a graphic diagram showing the procedure of a write-and-verify operation of an information recording/reproducing apparatus according to an embodiment of the present invention.
Figure 6:
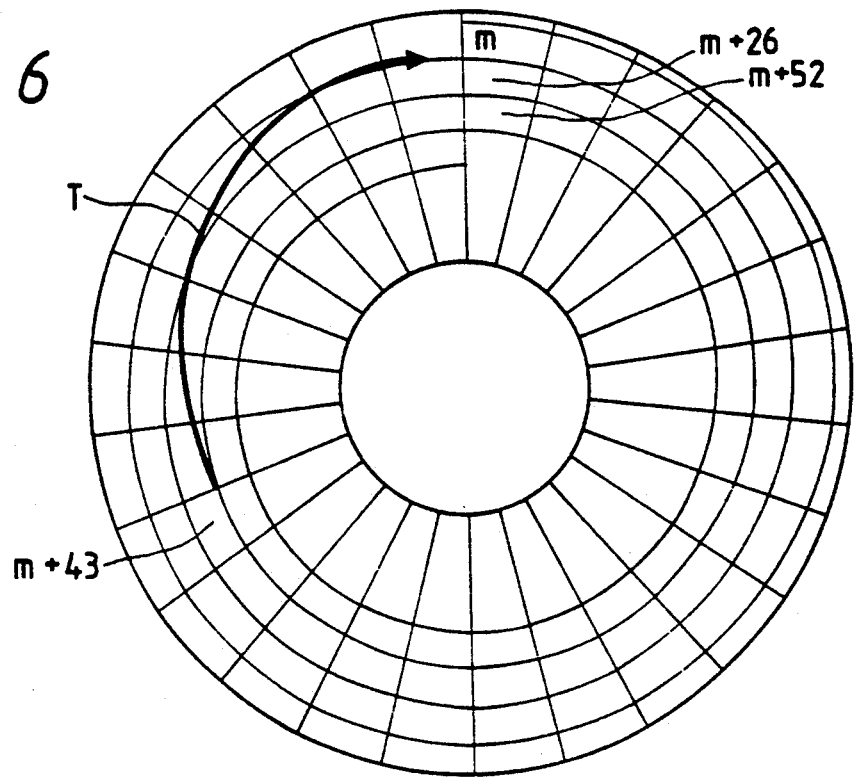
FIG. 6 is an illustration for describing the time required for performing a seeking operation and a verification-preparation.

A description will be made hereinbelow in terms of an information recording/reproducing apparatus according to an embodiment of the present invention with reference to FIGS. 1 and 5 to 7. FIGS. 5 and 6 are illustrations for describing the case that, under the condition that the buffer memory 4 of the controller 3 shown in FIG. 1 stores data corresponding to 48 sectors and the number of the sectors in one track of the recording medium 9 is 26, the write-and-verify operation is effected for the data corresponding to 56 sectors started from the sector m. Here, the 56 sectors to be written is greater than the capacity of the buffer memory 4 of the controller 3, and therefore the writing operation is executed with division into two blocks. FIG. 5 is an illustration for describing the write-and-verify operation under the above-mentioned conditions and FIG. 6 is an illustration for describing the write-and-verify operation for the data corresponding to 44 sectors when the number of the sectors in one track is 26. In FIG. 6, the seeking operation (verification preparation time) is indicated by an arrow T. In the operation, the verification is performed by the recording/reproducing head 8 after writing from the sector m up to the sector m+43, and therefore the verification preparation is made while the seeking operation is effected toward a track including the sector m. In the case illustrated in FIG. 6, the detection of the sector m can immediately be executed, and therefore the sector-waiting time required until the completion of the seeking operation and the verification preparation can become at a minimum.

Further, FIG. 5 shows the procedure of the write-and-verify command corresponding to the number of the recording sectors, where the vertical axis represents the time (rotational speed) and the horizontal axis represents the number of the sectors. In groups of one track of the recording medium 9, the number of the sectors in the first writing operation A is not fixed but varies in accordance with each of the groups, and the amount of the writing operation A is set to 44 sectors, for example. Thus, immediately after execution of the writing operation A and the verification preparation (seeking operation) B, the first sector m of the verification is detectable and hence the sector-waiting time C following the verification preparation B is minimized. Thereafter, the verification D is executed so that the first write-and-verify operation is completed. Further, after execution of a predetermined writing-sector-waiting operation E, the writing operation (F), seeking operation G, verifying-sector-waiting operation H and verification are similarly effected for the remaining 12 sectors, thereby completing the entire write-and-verify operation.

The following table shows the optimal value for the number of sectors in each of the different groups of sectors transferred in the write-and-verify operation.

| Group (Sector/Track) | Optimal Value of Write-and-Verify to be Performed at a Time |
|---|---|
| 28 | 28 + (28 − 8) = 48 |
| 27 | 27 + (27 − 8) = 46 |
| 26 | 26 + (26 − 8) = 44 |
| 25 | 25 + (25 − 8) = 42 |
| 24 | 24 + (24 − 7) = 41 |

-continued

| Group (Sector/Track) | Optimal Value of Write-and-Verify to be Performed at a Time |
|---|---|
| 23 | 23 + (23 − 7) = 39 |
| 22 | 22 + (22 − 7) = 37 |

That is, in an information recording/reproducing apparatus in which the time required for the seeking operation and the verification takes 8/28 rotation time when the capacity of the buffer memory 4 corresponds to 48 sectors and the number of the sectors in one track of the recording medium 9 is 28, the optimal values in the groups from 28 sectors/track to 22 sectors/track.

In the group of tracks having 24 sectors/track, the number of the sectors taken until the completion of the verification preparation due to the seeking operation is 8 sectors/28 sectors, that is, the number of the seeking and verification preparation sectors becomes 7 for 24 sectors. Further, since one sector is reduced (from 8 sectors to 7 sectors) after the group of the 25 sectors/track, the optimal number of the writing sectors to be transferred becomes 24 sectors+(24 sectors−7 sectors)=41 sectors.

Figure 7:
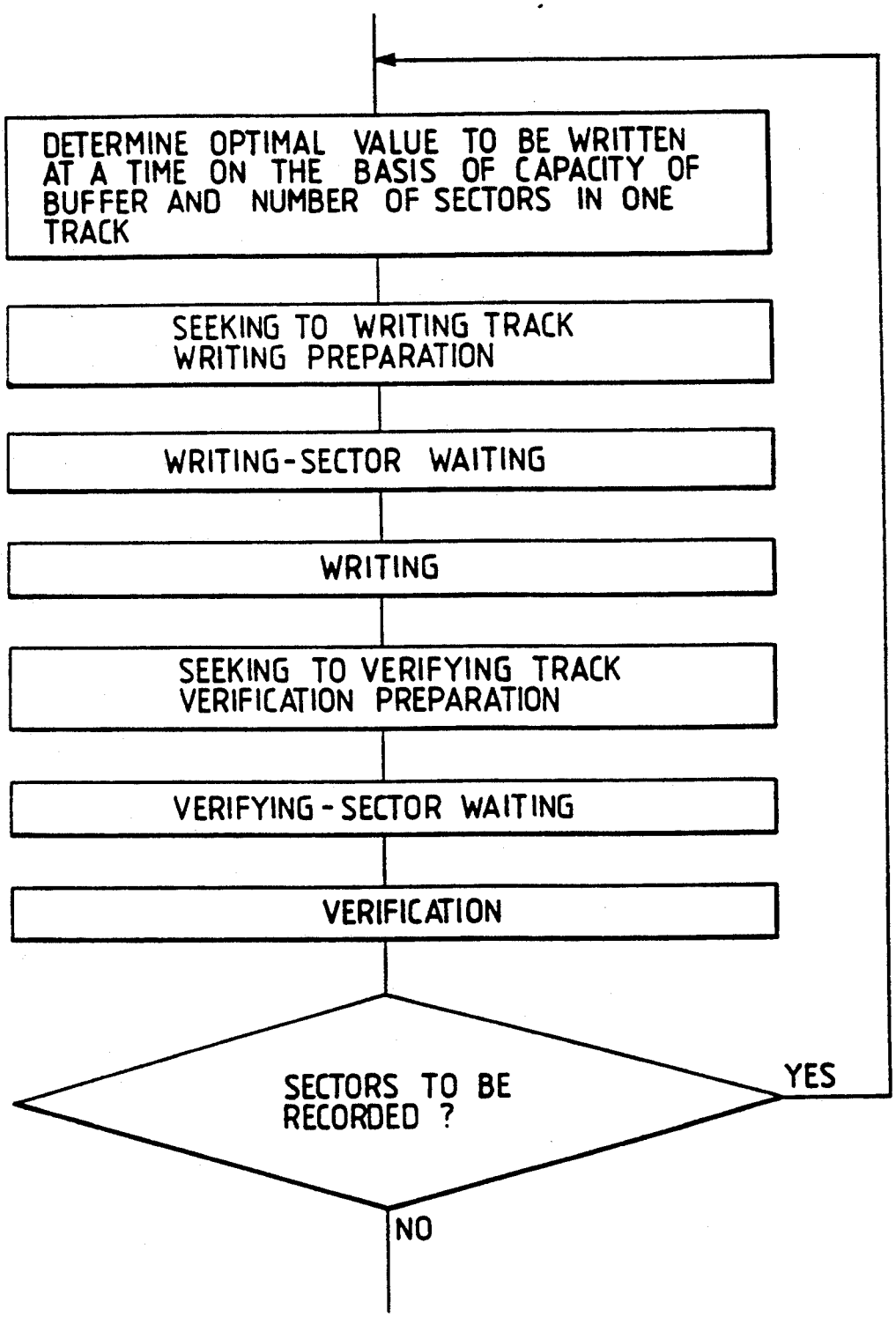
FIG. 7 is a flow chart showing the operation of the information recording/reproducing apparatus according to the embodiment of this invention.

FIG. 7 is a flow chart showing the operation of the information recording/reproducing apparatus according to this invention. In FIG. 7, the optimal value to be written at a time is first determined on the basis of the capacity of the buffer memory and the number of the sectors in one track, then followed by performing the seeking operation to the writing track and the writing preparation. After the writing sector waiting operation, the data is written, then followed by performing the seeking operation to the verification track and at the same time performing the verification preparation. After the verifying sector waiting operation, the verification is effected. Thereafter, it is determined if there are sectors to be recorded. If so, the operational flow returns to the initial process.

It should be understood that the foregoing relates to only an embodiment of the present invention, and it is intended to cover all changes and modifications of the embodiment of the invention herein used for the purposes of the disclosure, which do not constitute departures from the spirit and scope of the invention.

What is claimed is:

1. An information recording/reproducing apparatus comprising:
    a recording medium having thereon spiral or coaxial tracks and rotatable by rotating means;
    memory means for temporarily storing information;
    head means for recording the information stored in the memory means on said recording medium and for reproducing the information from said recording medium; and
    control means coupled to said head means and said memory means for controlling recording and reproducing of the information on and from said recording medium through said head means,
    said control means including:
        verifying means to verify the recorded data on said recording medium, and
        dividing means for dividing data to be recorded on the recording medium into two or more groups of sectors to record each of the divided groups on said recording medium in a single operation,
    said dividing means varying the number of sectors of each group of sectors recorded by said head means so that the number of sectors recorded in each of said divided groups is determined in accordance with a time necessary for movement of said head means up to a recording start position of said recording medium, a predetermined preparing time necessary for verification of said verifying means, and the number of sectors in each of the tracks formed on the said recording medium.

2. An information recording/reproducing apparatus as claimed in claim 1, wherein said control means determines the number of sectors to be recorded on said recording medium in each individual operation in accordance with the divided groups of sectors so that a sector-waiting time taken until the recorded data are reproduced for the verification after lapsing of said predetermined preparing time becomes at a minimum.

3. An information recording/reproducing apparatus as claimed in claim 1, wherein the coaxial or spiral tracks of said recording medium are divided radially into a plurality of track groups, and the number of the sectors per track in each of said divided track groups is a variable number successively varied in the radial directions of said recording medium.

4. An information recording/reproducing apparatus comprising:
   a recording medium having thereon spiral or coaxial tracks and rotatable by rotating means each track storing a number of sectors of data recorded thereon;
   memory means for temporarily storing a predetermined number of sectors of data of information to be recorded on said recording medium;
   head means operating in a plurality of individual recording operations and individual reproducing operations for recording the information stored in the memory means on said recording medium and for reproducing information from said recording medium; and
   control means coupled to said head means and said memory means for controlling recording and reproducing of the information on and from said recording medium through said head means,
   said control means including:
      verifying means to verify data recorded on said recording means, and
      dividing means for dividing the information to be recorded on the recording medium into two or more groups of sectors of data for recording on said recording medium, thereby varying the numbers of sectors recorded on the recording medium in an individual recording operation,
   said dividing means determining the number of sectors to be included in each said group of sectors to be recorded in an individual recording operation in accordance with:
      a first time necessary for movement of said head means to a recording start position of said recording medium,
      a second time necessary for verification of said verifying means, and
      the number of sectors in each of the tracks formed on the said recording medium.

5. An information recording/reproducing apparatus as claimed in claim 4, wherein the coaxial or spiral tracks of said recording medium are divided radially into a plurality of track groups, and the number of the sectors per track in each of said divided track groups is a variable number determined as a function of radial displacement of said track group along said recording medium,
   said dividing means determining the number of sectors to be included in each said group of sectors to be recorded in a track of each said track group in an individual recording operation in accordance with said variable number of sectors per track therein as determined in accordance with said radial displacement thereof.

6. An information recording/reproducing apparatus as claimed in claim 5, wherein said dividing means computes said number of sectors to be included in each said group of sectors to be recorded in an individual recording operation in accordance with an algorithm as a function of said variable number of sectors per track and of a capacity of said memory means for temporarily storing said predetermined number of sectors of data; and
   said control means is programmed to utilize said computed number of sectors to transfer to said head means a group of sectors comprised of said computed number of sectors of data, thereby to cause said head means to record on said recording medium in a single operation a group of sectors comprised of said computed number of sectors of data.

7. An information recording/reproducing apparatus as claimed in claim 6, wherein said control means is further programmed to control said head means to seek a predetermined track and, after a writing-sector waiting operation, to write the group having said computed number of sectors therein, to seek a track for data verification while performing verification preparation, and to perform a sector waiting time to wait for the track for data verification prior to performance of data verification by said verifying means, thereby minimizing the sector waiting time performed by said head means while waiting for the track for data verification.

* * * * *